Patented Dec. 14, 1943

2,336,482

UNITED STATES PATENT OFFICE 2,336,482

METHOD OF TREATING EMULSIONS

Marcus R. Hatfield, Lakewood, Ohio, assignor to National Carbon Company, Inc., a corporation of New York No Drawing. Application September 24, 1940, Serial No. 358,086

2 Claims. (Cl. 252—325)

This invention relates to emulsions, and more particularly to the problem of resolving emulsions.

One of the more important, as well as more difficult, problems of emulsion resolution is encountered in the handling of crude petroleum. Emulsions of water in petroleum form in wells, in the mechanical appliances used for production, or in the flow lines above ground. Some oil desalting processes involve a deliberate emulsification of added water to effect a thorough washing of the oil, and in such processes the successful removal of salt depends upon the successful resolving of the emulsion.

Gravity settling, sometimes assisted by heat and enough pressure to prevent the escape of volatile constituents, will resolve "loose" or unstable emulsions. Settling is a slow and inefficient method, unsuited for the resolution of "tight" emulsions of high stability. Centrifugal settling is more rapid than gravity settling, but it does not resolve very stable emulsions.

The speed and efficiency of setting may be materially enhanced by adding to the emulsion a chemical which tends to break it. Many such chemicals have been used, with some success. Intimate contact of the emulsion with a solid, effected either by mixing the solid with the emulsion or by filtering the emulsion through the solid, also breaks the emulsion to a limited extent and to that extent hastens settling. Chemically treated emulsions are at times passed through towers packed with excelsior, broken glass, gravel, steel shavings, or other comminuted materials to expedite the breaking of the emulsion. Such methods have only a limited resolving power, and there is a demand for improvements, both in power to resolve more stable emulsions and in economy in consumption of chemicals.

One object of this invention is to provide a novel and improved method for resolving emulsions, including emulsions of water in crude petroleum, more rapidly and thoroughly, and with lower consumption of chemicals, than has been attainable in practice by previously proposed chemical methods.

The method of the invention comprises passing an emulsion, preferably pretreated chemically, through a uniformly, finely porous mass of carbon. After such treatment, even a relatively tight emulsion will separate by settling.

The chemical agent added to the oil may be any demulsifying chemical agent, of which many are known. Ordinarily, I prefer an agent of the kind which promotes the formation of an opposite type emulsion, i. e. to an emulsion of water in oil I prefer to add an agent which promotes the formation of an emulsion of oil in water. Examples of such agents are soaps and organic acid sulfonates. Another very useful kind of agent is exemplified by soda ash and lime. In most cases, the amount of demulsifying agent need not be more than a small fraction of one per cent of the amount of the emulsion to be treated.

A self-supporting mass of carbon, such as may be formed by agglomeration, bonding, or, in the case of some metals, sintering, is employed. The mass should be uniformly and finely porous, the pores consisting of a multitude of small, tortuous passages which are fairly uniform in diameter and in distribution. A preferred material is that described, for instance, by L. C. Werking in "Fabricated Porous Carbon," Trans. The Electrochemical Soc., vol. 74, P. 365 (1938). This material comprises essentially a mass of carefully sized carbon particles, bonded with carbon to form a rigid, uniformly porous material in which the pores are interconnected in all directions.

In general, the smaller the pore size of the porous carbon mass, and the greater its thickness, the greater will be its resolving power for stable emulsions, but the maintenance of economically practical rates of flow of emulsion at reasonable pressure heads limits both the pore fineness and the thickness of the mass. If the emulsion contains suspended finely divided solids, the pore size of the mass should be great enough to permit the free passage of those solids. For the treatment of emulsions of water in crude petroleum, a one-inch thick mass of porous graphite or carbon of the "grade 20" described by L. C. Werking in the article just mentioned has been found to be particularly satisfactory.

Passage of the emulsion through the interconnecting, tortuous passages of porous carbon effectively subjects the interfacial films between the two liquids to violently changing stresses of large magnitude, thus tending to coalesce the suspended droplets. It also subjects the droplets to rapid turbulence which brings them into juxtaposition so that coalescence may take place. Further, it intimately mixes the demulsifying chemical with the emulsion, thereby speeding and enhancing its action.

Although the foregoing description has emphasized the treatment of emulsions of fresh or salt water in crude petroleum, the invention is applicable to the resolution of emulsions generally.

It will be apparent that such expedients as the use of heat and pressure may be used in conjunction with the method of the invention. Preheating of the oil will sometimes be advantageous to decrease its viscosity and, incidentally, to assist somewhat the breaking of the emulsion.

I claim:

1. In a method of resolving an emulsion of water-in-oil by passing the same through a porous contact mass, the improvement which comprises passing the emulsion through the pores of a mass of sized carbon particles bonded with carbon, in the form of a rigid, self-supporting mass consisting of porous carbon in which the pores are interconnected in all directions whereby channeling of said emulsion through said material and contamination of said emulsion with said material are avoided; and thereafter separating the immiscible constituents of the emulsion by gravity settling.

2. The method of resolving an emulsion of water in crude petroleum which comprises adding to the emulsion a demulsifying chemical agent of the type which promotes the formation of an oil-in-water emulsion; passing the emulsion, containing such agent, through the pores of a uniformly, finely porous, self-supporting, agglomerated mass of sized carbon particles bonded with carbon in the form of a rigid mass consisting of porous carbon in which the pores are interconnected in all directions; and thereafter separating the immiscible constituents of the emulsion by gravity settling.

MARCUS R. HATFIELD.